March 9, 1926.
L. T. THORN
1,575,950
CITY LICENSE AND IDENTIFICATION CARD HOLDER FOR MOTOR VEHICLES
Filed March 6, 1925
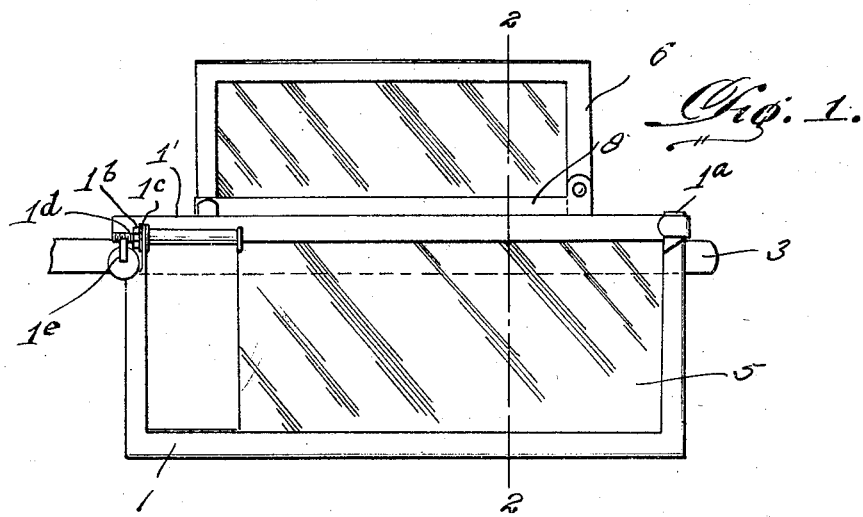
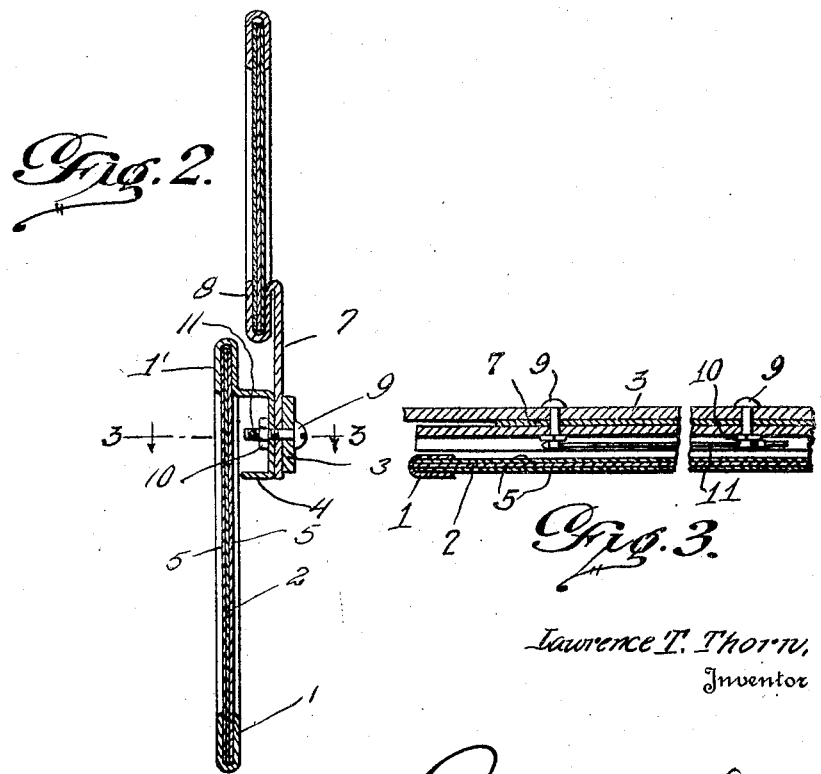
Lawrence T. Thorn,
Inventor
By Clarence A. O'Brien
Attorney Patented Mar. 9, 1926.

1,575,950

UNITED STATES PATENT OFFICE.

LAWRENCE T. THORN, OF HARRISBURG, ARKANSAS.

CITY LICENSE AND IDENTIFICATION CARD HOLDER FOR MOTOR VEHICLES.

Application filed March 6, 1925. Serial No. 13,561.

*To all whom it may concern:*

Be it known that I, LAWRENCE T. THORN, a citizen of the United States, residing at Harrisburg, in the county of Poinsett and State of Arkansas, have invented certain new and useful Improvements in City License and Identification Card Holders for Motor Vehicles, of which the following is a specification.

This invention relates to the construction of a city license and identification card holder for motor vehicles and particularly to the interlocking cooperation between the separate holders when secured to the supporting bracket.

In carrying out the present invention, it is my purpose to provide an improved holder for the usual city license plates and identification cards of motor vehicles primarily but not specifically adapted to be employed in conjunction with the license plate holder shown and described in my Patent No. 1,581,937, dated January 30, 1924, it of course being understood that the present holder may be equally as well employed in conjunction with the well known form of license plate now issued by all States.

A further purpose of this invention resides in the provision of such a holder that may be readily disassembled for receiving the city license plate and identification card, the device when assembled being preferably maintained in this position through the medium of a seal for considerably lessening the liability of any one tampering with the tag or identification card in the event of the vehicle being stolen.

A still further purpose of the invention resides in the provision of such a holder that is equipped with a means for expeditiously attaching the same to the usual license tags of vehicles or the license plate holder shown in the above set forth application.

A still further purpose of this invention is to provide such a holder that is comparatively simple of construction and one that embraces at the same time the desired features of efficiency and durability and one that may be manufactured and marketed at small cost.

The nature and advantages of the invention will be better understood when the following detailed description is read in connection with the accompanying drawings, the invention residing in the construction, combination, and arrangement of parts as claimed.

In the drawings, forming part of this specification, like numerals of reference indicate similar parts in the several views, and wherein:

Figure 1 is a view showing my article attached to the type of license plate holder shown in the above set forth application; and Figure 2 is a detail section, taken substantially upon the line 2—2 of Figure 1.

Figure 3 is a longitudinal section taken on line 3—3 of Figure 2.

This invention embodies the provision of a license plate holder 1 which is in the form of a U-shaped open frame member constructed of suitable sheet metal of U-shape in cross section to provide a channel for receiving the edges of the license plate. This license plate is indicated at 2 and is retained within the U-shaped frame member 1 by the cooperating section 1' which is provided with an interlocking connection at 1ª with one leg of the U-frame 1, while at the opposite end it is provided with an ear 1ᵇ which registers with an opening in the ear 1ᶜ on the frame 1 so that the bolt 1ᵈ when extended through the openings in the ears will mount the section 1' and the U-shaped frame 1 in rigid interlocked relation. The seal 1ª forms a means for sealing the parts in assembled relation to prevent tampering therewith and in order to notify unauthorized removal of the license tag from the holder without the same being detected by the broken seal. The cooperating section of the license tag holder is provided with the pendant channel strip 4 from one edge thereof as shown in Fig. 2, which is formed with a pair of openings to align with the openings in the supporting bracket 3 carried by the motor vehicle. The interlocking connection 1ª is formed by providing tongue extensions on the end of the cooperating section 1' and on one leg of the frame 1 which are bent back upon the main portions of the parts mentioned in spaced relation in order that the bent back extensions will prevent the removal of the cooperating section 1' from the main frame 1. Suitable transparent plates are mounted on the front and rear of the license tag 2 and within the frame to form a protecting means for the license tag.

In this connection the city license tag and identification card holder 6 has the pendant flange of the retaining strip 8 inserted between the pendant channel strip 4 of the holder 1 and said bracket 3 to be secured therebetween by bolts 9, it being of course, understood that as above pointed out, the said flange of the city license tag and identification card holder is provided with openings in alignment with the openings in the channel strip 4 and bracket 3. These bolts 9 are also equipped with nuts 10 as well as being provided with openings forwardly of said nuts for receiving a nut retaining rod 11, this rod being provided at one end with an opening for receiving a seal.

In view of the above description, it is believed by me that the purpose and advantages of a holder as shown and described will be readily appreciated by those skilled in the art, and although I have herein shown and described the preferred embodiment of the present invention, it is nevertheless to be understood that minor changes may be made therein without departing from the spirit and scope of the invention as claimed.

What is claimed:

In combination, a city license tag holder having a projection on the lower end, a license bracket, a license plate holder having a bulged portion on the rear side forming a channel within the bulged portion, the said city license tag holder, license bracket, and plate holder having aligned openings therein, securing members passed thru said openings, fastening means within the channel engaging said securing members for mounting the several parts in associated relation, whereby a license plate sealed in the license holder encloses said fastening means for preventing disassemblage of the parts without breaking the seal between the license and its holder.

In testimony whereof I affix my signature.

LAWRENCE T. THORN.